US011827387B2

(12) United States Patent
Lairson

(10) Patent No.: US 11,827,387 B2
(45) Date of Patent: Nov. 28, 2023

(54) MONOCRYSTAL SILICON CARBIDE GRIDS AND RADIATION DETECTION SYSTEMS COMPRISING THEREOF

(71) Applicant: Bruce Lairson, Ventura, CA (US)

(72) Inventor: Bruce Lairson, Ventura, CA (US)

( * ) Notice: Subject to any disclaimer, the term of this patent is extended or adjusted under 35 U.S.C. 154(b) by 334 days.

(21) Appl. No.: 17/409,238

(22) Filed: Aug. 23, 2021

(65) Prior Publication Data

US 2022/0185508 A1 Jun. 16, 2022

Related U.S. Application Data

(60) Provisional application No. 63/125,150, filed on Dec. 14, 2020.

(51) Int. Cl.
*B64G 1/66* (2006.01)
*G01T 1/24* (2006.01)

(52) U.S. Cl.
CPC .................. *B64G 1/66* (2013.01); *G01T 1/24* (2013.01)

(58) Field of Classification Search
CPC .................................... B64G 1/66; G01T 1/24
See application file for complete search history.

(56) References Cited

U.S. PATENT DOCUMENTS

| 7,737,424 | B2 | 6/2010 | Xu et al. |
| 8,989,354 | B2 | 3/2015 | Davis et al. |
| 9,640,358 | B2 | 5/2017 | Kostamo et al. |
| 2004/0251431 | A1 | 12/2004 | Yamaguchi et al. |
| 2006/0144778 | A1 | 7/2006 | Grunthaner et al. |
| 2008/0296479 | A1 | 12/2008 | Anderson et al. |
| 2008/0296518 | A1* | 12/2008 | Xu .......................... H01J 47/004 250/505.1 |
| 2009/0086923 | A1* | 4/2009 | Davis ........................ H01J 5/18 156/279 |
| 2009/0173897 | A1* | 7/2009 | Decker ...................... H01J 5/18 250/505.1 |

(Continued)

OTHER PUBLICATIONS

Rahman et al., Super-Radiation Hard Particle Tracking at the CERN SLHC, IEEE Transactions on Nuclear Science, vol. 50, No. 6, Dec. 2003 (Year: 2003).*

(Continued)

*Primary Examiner* — Hugh Maupin
(74) *Attorney, Agent, or Firm* — Polygon IP, LLP

(57) ABSTRACT

Disclosed here are monocrystalline silicon carbide grids and radiation detections systems comprising such grids. Specifically, a grid comprises a support frame and a grid portion. The support frame is used for installing and supporting the grid in a detection system. The grid portion comprises a plurality of ribs, which defines a plurality of grid openings. The grid portion is used to support various components (e.g., a membrane) while allowing radiation transmission through the grid. For example, the grid portion can support the pressure up to 2 bars. The open area fraction of the grid portion can be at least 50%, or even at least 90%. The grid portion is integrated with the support frame forming monocrystal silicon carbide (e.g., 4H—SiC polymorph). In some examples, the primary surface of the grid is oriented within 8° of the crystallographic c-axis planes of the monocrystal.

20 Claims, 8 Drawing Sheets

(56) References Cited

U.S. PATENT DOCUMENTS

| | | | |
|---|---|---|---|
| 2013/0064355 A1* | 3/2013 | Davis | G21K 1/00 378/204 |
| 2014/0044240 A1* | 2/2014 | Pahlke | H01J 5/18 378/161 |
| 2019/0345631 A1* | 11/2019 | Fujikawa | C30B 35/007 |
| 2022/0155473 A1* | 5/2022 | Liu | C01B 32/05 |

OTHER PUBLICATIONS

Barret, D. et al., "The ATHENA X-ray Integral Field Unit (X-IFU)", Proc. SPIE 9905, Space Telescopes and Instrumentation 2018: Ultraviolet to Gamma Ray (Jul. 31, 2018)); http://proceedings.spiedigitallibrary.org/ on Feb. 24, 2017 Terms of Use: http://spiedigitallibrary.org/ss/termsofuse.aspx.

Abderrazak, H."Silicon Carbide: Synthesis and Properties" 1 X Silicon Carbide: Synthesis and Properties (2013).

Kato M. et al., "Electrochemical Etching of 6H—SiC Using Aqueous KOH Solutions with Low Surface Roughness", Japanese Journal of Applied Physics 42(7A):4233-4236 •(2003).

Kilbourne C. et al., J. of Astronomical Telescopes, Instruments, and Systems, 4(1), 011215 (2018). https://doi.org/10.1117/1.JATIS.4.1.011215.

Kitahara, H. "Mechanical Behavior of Single Crystalline and Polycrystalline Silicon Carbides Evaluated by Vickers Indentation", J. Ceramic Society of Japan p. 602 (2001).

O'Dell S., Modeling contamination migration on the Chandra X-ray Observatory—IV, https://ntrs.nasa.gov/archive/nasa/casi.ntrs.nasa.gov/20170008755.pdf (2017).

Ozgur M. et al., "Plasma Etching of Deep High-Aspect Ratio Features into Silicon Carbide", Journal of Microelectronics Systems JMEMS.2017.2661961 (2017).

* cited by examiner

MONOCRYSTAL SILICON CARBIDE GRIDS AND RADIATION DETECTION SYSTEMS COMPRISING THEREOF

CROSS-REFERENCE TO RELATED APPLICATIONS

This application claims the benefit under 35 U.S.C. § 119(e) of U.S. Provisional Patent Application 63/125,150, filed on 2020 Dec. 14, which is incorporated herein by reference in its entirety for all purposes.

BACKGROUND

Radiation detection systems are used for various applications, such as microscopy, X-ray telescopy, electron spectroscopy, and X-ray spectroscopy. Radiation detection systems often use grids, positioned on the radiation paths to the detectors. A grid can support a membrane, electrically isolate different spatial regions, and/or provide electric fields to accelerate charged particles. Furthermore, a grid can be used to block unwanted electromagnetic interference and/or to create electromagnetic fields for charged particle acceleration and steering. In general, grids can enhance various functions of radiation detecting systems as well as radiation generating systems.

Grids are typically formed from stainless steel, nickel, copper, or silicon. For example, silicon monocrystal grids have been used as X-ray detector window supports (e.g., X-ray pressure windows) and as supports for spacecraft instrument filters. These silicon monocrystal grids are typically fabricated using crystallographic face wet etching. However, the resulting unidirectional ribs are subject to twisting, which can create various reliability issues. Furthermore, silicon is a relatively weak material, often requiring thick ribs and resulting in low open area fractions. As a result, systems comprising such grids often suffer from the excessive occlusion of the transmitted radiation, particularly if the transmitted radiation is uncollimated. Silicon is also easily scratched because of its low hardness and fracture toughness, leading to catastrophic failures when scratched by steel tools.

What is needed are new types of grid assemblies, such as monocrystal silicon carbide grid assemblies and radiation detections systems using such grids.

SUMMARY

Disclosed here are monocrystalline silicon carbide grids and radiation detections systems comprising such grids. Specifically, a grid comprises a support frame and a grid portion. The support frame is used for installing and supporting the grid in a detection system. The grid portion comprises a plurality of ribs, which defines a plurality of grid openings. The grid portion is used to support various components (e.g., a membrane) while allowing radiation transmission through the grid. For example, the grid portion can support the pressure up to 2 bars. The open area fraction of the grid portion can be at least 50%, or even at least 90%. The grid portion is integrated with the support frame forming monocrystal silicon carbide (e.g., 4H—SiC polymorph). For purposes of this disclosure, the terms "monocrystal silicon carbide" and "single-crystal silicon carbide" are used interchangeably and intended to have the same meaning, which is defined below. In some examples, the primary surface of the grid is oriented within 8° of the crystallographic c-axis planes of the monocrystal.

These and other embodiments are described further below with reference to the figures.

DETAILED DESCRIPTION

Figure 1A:
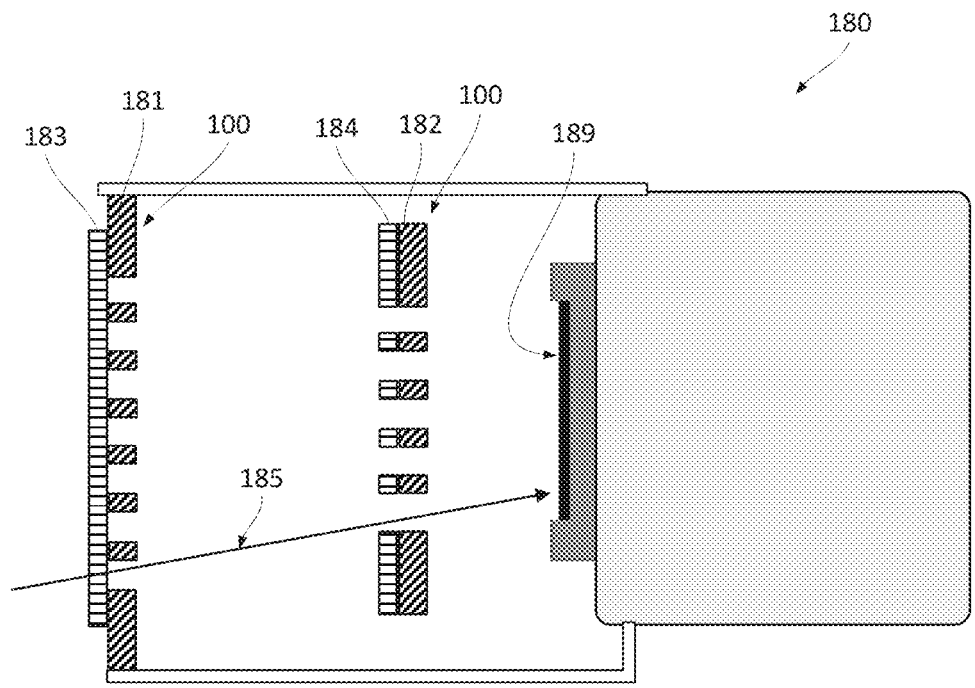
FIG. 1A is a cross-sectional schematic view of a radiation detection system, comprising a monocrystalline silicon carbide grid, in accordance with some examples.

In the following description, numerous specific details are set forth in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

INTRODUCTION

As noted above, grids are often used in radiation detection systems. Specifically, grids are positioned on the radiation paths to the detectors. The grid performance, such as radiation transmission, can be improved by increasing an open area fraction. For purposes of this disclosure, an open area fraction is defined as a ratio of the cumulative area of all grid openings to the total area of the grid portion, where these openings are provided. Furthermore, increasing the thickness-to-width ratio of the structures positioned on the radiation path (e.g., ribs that define grid openings) can further improve the grid performance. For purposes of this disclosure, this thickness-to-width ratio is referred to as an aspect ratio. The thickness is a dimension along the radiation path, while the width is a dimension perpendicular to the thickness. Other characteristics of the grid, which can improve the grid performance, are low radiation absorption, low radiation scatter, and minimal rib width. These characteristics reduce the deleterious nature of the grid on the traversing radiation beam, by reducing the scattered radiation content and spatial inhomogeneity in the traversing radiation. Traditional materials (e.g., silicon) have difficulty achieving these characteristics because of their polycrystalline nature or because of their low strength. Another important grid characteristic is high thermal conductance to remove the energy absorbed by the window. High thermal conductance can be achieved by high thermal conductivity or a high grid bar aspect ratio. Achieving high thermal conductance and low radiation absorptance is problematic for traditional grid materials.

Silicon carbide monocrystals have unique material characteristics making these monocrystals particularly suitable for grid applications in radiation transmittance systems and/or electromagnetic field control systems. For example, silicon carbide monocrystals have high elastic modulus (e.g., 400 gigaPascals), high heat resistance (e.g., 2000° C.), high thermal conductivity (e.g., 490 Watts/meter-Kelvin), and are stable at very high temperatures and in very harsh plasma environments. Overall, the desirable material properties for grid applications include high strength, high mechanical resonant frequency, high heat conductance, high electrical conductance, low particle scattering, low absorption of detected radiation, and low emittance of non-desired radiation (e.g., transition metal fluorescence or thermal photons).

For purposes of this disclosure, "silicon carbide" refers to the polymorphs of silicon and carbon, which have approximately 1:1 stoichiometry (e.g., 2H—SiC, 4H—SiC, 3C—SiC, 6H—SiC, etc.), e.g., between 0.9-1.1Si:0.9-1.1C with up to 5 atomic percent impurities or dopants or, more specifically, between 0.98-1.02Si:0.98-1.02C and 1.02Si with up to 2 atomic % impurities or dopants. Silicon carbides include materials related via the introduction of stacking faults into the silicon carbide crystal structure. Silicon carbide structures may also be doped with various impurities in amounts up to 1 atomic percent.

For purposes of this disclosure, the term "silicon carbide monocrystal" refers to a silicon carbide material that is physically interconnected/monolithic. Furthermore, this material has a fixed crystallographic orientation throughout its volume. The silicon carbide monocrystal can be comprised of various polymorphs which lie in a fixed orientation to one another, for example with parallel crystallographic axes or substantially coplanar atomic planes. Polymorphs can be grown together in the same monocrystal by changing the stacking sequence along a given crystal axis via directional crystal growth. Other materials can be attached to the silicon carbide monocrystal, for example by thin film deposition or with adhesive, which are considered separate elements in this disclosure.

Generally, silicon carbide monocrystals are not used as mechanical elements due to the very poor toughness of silicon carbide monocrystal, e.g., compared with silicon carbide polycrystals. However, it has been unexpectedly found that grids fabricated from silicon carbide monocrystals can be fabricated into a grid geometry with very high effective strength while retaining the other desirable properties of silicon carbide monocrystals. For example, the primary surface of a grid can be within 8° of the crystallographic c-axis of the silicon carbide monocrystal, forming this grid. This crystallographic orientation ensures mechanical isotropy of the overall grid structure. This orientation also facilitates uniformity within the grid structure, by minimizing the effect of differential etch rates between the different atomic planes of the crystal when the grid is fabricated.

Disclosed here are monocrystalline silicon carbide grids and radiation detections systems using such grids. Specifically, a grid comprises a support frame and a grid portion. The grid portion is integrated with the support frame such that the support frame and the grid portion form monocrystal silicon carbide, leveraging various desirable characteristics of this material described above. The grid portion comprises a plurality of ribs, which defines a plurality of grid openings to provide the radiation transmission through the grid. The ribs are monolithically coupled to each other forming one continuous grid portion. Furthermore, this grid portion is monolithic and continuous with the support frame. The open area fraction of the grid portion can be at least 50%, at least 80%, or even at least 90%. Furthermore, the rib aspect ratio, defined as a rib thickness-to-rib width ratio can be at least 0.5 or even at least 1.0. A larger aspect ratio increases the grid strength and heat conductance, which can be beneficial for radiation detector systems and other applications. Monocrystalline silicon carbide and the specific geometry of the grid portion allow using narrow ribs, with the rib width measured in the direction nominally perpendicular to the path of the traversing radiation. In some examples, the rib width is less than 200 micrometers, less than 100 micrometers, or even less than 50 micrometers. In some examples, the ribs vary in shape and planar position, e.g., some ribs may have different widths, thicknesses, and/or out-of-plane positions as further described below.

Radiation Detection System Examples

Various radiation detections systems can utilize monocrystal silicon carbide grids for detecting photons, electrons, protons, atoms, or molecules. Some examples of such radiation detections systems include, but are not limited to, X-ray detectors, ion beam spectrometers, infrared photon detectors, electron spectrometers, and plasma diagnostic equipment. FIG. 1A is a schematic illustration of radiation detection system 180, in accordance with some examples. Radiation detection system 180 comprises multiple grids 100, which may be referred to as first grid 181 and second grid 182 or optical path elements. For example, first grid 181 can be a part of the overall enclosure of radiation detection system 180 and isolate detector 189 from the environment. Specifically, first grid 181 is shown with membrane 183, various examples of which are described below with reference to FIG. 3D. Membrane 183 is supported by the grid portion of first grid 181. The grid portion comprises a plurality of grid openings allowing radiation path 185 to pass through first grid 181. At the same time, membrane 183 prevents the ambient environment from entering the enclosure. In some examples, the enclosure is kept at near-vacuum conditions (e.g., the pressure of less than 0.5 milliBar). The ambient environment can be at ambient pressure (e.g., from 1 milliBar to 2 Bar). Therefore, membrane 183 and, more specifically, the grid portion can support the pressure gradient of at least 0.5 milliBar or even at least about 2 Bar.

In some examples, membrane 183 is operable as a radiation filter, bypassing certain X-ray or electron energies and absorbing undesired energies. For example, membrane 183 prevents detector 189 from being exposed to undesired visible, infrared, and ultraviolet photons. In additional examples, membrane 140 is operable as a thermal barrier by absorbing and reflecting thermal photons. The high heat conductance of grid 100 allows the absorbed photon energy to be efficiently transferred to a thermal reservoir, e.g., at a support frame. In some examples, membrane 183 is a barrier that prevents gas or contaminants from reaching detector 189. In additional examples, membrane 183 acts as a gas pressure barrier.

Referring to FIG. 1A, second grid 182 comprises conductive coating 184, various examples of which are described below with reference to FIG. 3E. Second grid 182 is used as an electromagnetic filter. Specifically, coating 184 imbues second grid 182 with electrical screening properties.

Referring to FIG. 1A, radiation path 185 is able to pass through first grid 181 and second grid 182 and reach detector 189. In some examples, first grids 181 and/or second grid 182 are mechanically, thermally, and/or electrically connected to the rest of radiation detection system 180, e.g., to provide gas isolation, thermal load, and/or electrical isolation functions. Detector 189 can have a monolithic sensor with a single output or a segmented sensor to provide pixelated or imaged output. Detector 189 can be arrayed as a planar absorber, such as a charge-coupled device (CCD) camera or a cascaded amplifier (e.g., a photomultiplier).

Examples of radiation detector 189 are a diode, a cooled imaging CCD camera, a CMOS camera, a photomultiplier, a solid-state detector, a drift detector, a photomultiplier, or an X-ray microcalorimeter. Many other types of detectors 189 are also within the scope. Detector 189 senses radiation particles within radiation path 185, for example, electrons or photons, which pass through grids 100 and are incident on the face of detector 189. In some examples, the traversing radiation passes through the ribs or frame of each grid 100, allowing the radiation to also be detected. Silicon carbide monocrystal used for grids 100 is particularly useful for detecting the radiation passing through the ribs due to its low scattering and low absorptance properties, combined with the lower rib thickness enabled by the high strength of silicon carbide monocrystal.

While FIG. 1A illustrates two monocrystal silicon carbide grids 100, any number of grids 100 can be positioned on radiation path 185 to ensure the desired system function. In some examples, only one monocrystal silicon carbide grid with an attached membrane is inserted into the radiation path of a silicon drift detector. In other examples, a monocrystal silicon carbide grid supporting an aluminized membrane with visible light transmittance of less than 1% is inserted into radiation path 185 of a cooled charge-coupled device (CCD) or complementary metal-oxide semiconductor (CMOS) detector. In some examples, a set of monocrystal silicon carbide grids with attached aluminized polymer membranes are inserted into radiation path 185 of an X-ray microcalorimeter detector maintained at cryogenic temperatures. In some examples, one or more monocrystal silicon carbide grids coated with conductive material are inserted into radiation path 185 of an electron detector.

Overall, the membrane can be a single layer, such as silicon nitride, a metal layer, or a polymer. In other examples, the membrane is a multiple-layer stack, such as a set of polymers, metals, and ceramics. The membrane can also be composed of the same silicon carbide crystal as the substrate. The membrane can be selected to provide energy filtering for incident radiation or perform other functions. A grid can also be configured to incorporate both a conductive coating and an attached membrane. In some examples, the membrane is attached by physical deposition, and the grid is selectively etched to leave the membrane attached to the ribs.

The grid and associated radiation detection system can be useful for a variety of applications including electron microscopy, electron spectroscopy, atomic beam detection, X-ray telescopy, and X-ray spectroscopy. The grid can also be used to dissipate heat for high-intensity proton or neutron beams.

For some types of radiation windows, high heat conductance is essential for their proper function. One example is membrane filters used for synchrotron beams. Because of the high X-ray fluence, the desired filter material can heat beyond its usable service temperature and fail. An attached grid assembly with high heat conductance should desirably reduce the peak temperature, while negligibly absorbing the transmitted beam. High heat conductance silicon carbide monocrystal grid assemblies improve the performance of cooled X-ray detectors by reducing the radiation heat load on the sensor. High heat conductance is realized due to the high thermal conductivity of silicon carbide monocrystal, and by fabricating the grid assembly ribs with a high aspect ratio.

Grid 100 can also be used in radiation detector systems without membranes. In one embodiment, a silicon carbide monocrystal grid assembly is used to electrically isolate electrons into different spatial regions for purposes of acceleration, focusing, and energy filtering. The monocrystal silicon carbide grid can be subjected to very high temperatures and plasma bombardment. In one test, a monocrystal silicon carbide grid assembly was immersed in a flame plasma at a temperature of approximately 1500° C. without any physical degradation.

Figure 1B:
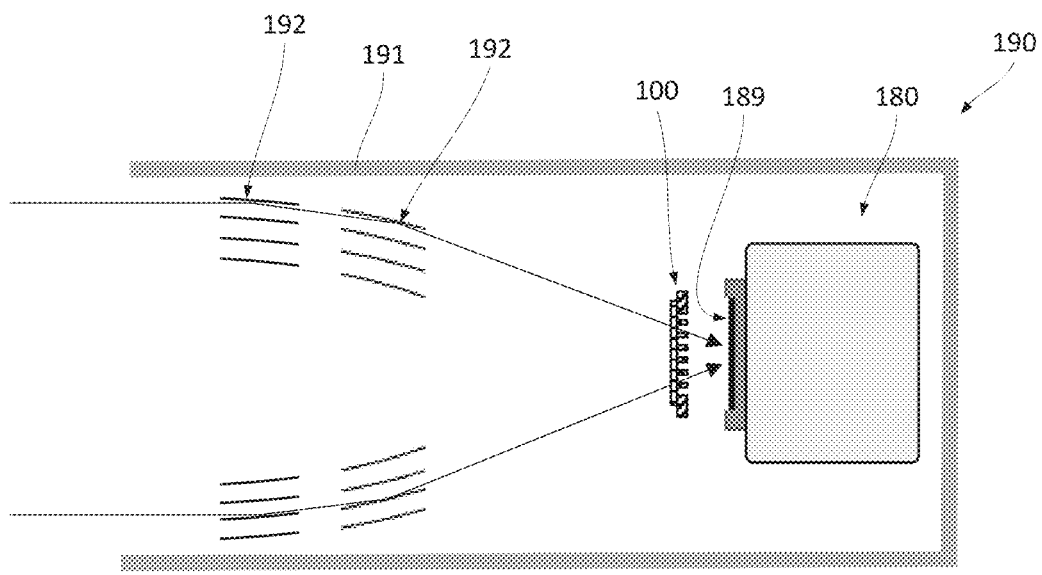
FIG. 1B is a cross-sectional schematic view of a satellite portion comprising a radiation detection system with a monocrystalline silicon carbide grid, in accordance with some examples.

FIG. 1B is a schematic illustration of satellite 190 equipped with monocrystal silicon carbide grid 100, in accordance with some examples. Overall, satellite 190 can include radiation detection system 180, various examples of which are described above with reference to FIG. 1A. Satellite 190 also comprises satellite housing, protecting various interior components of satellite 190 from the environment. Furthermore, satellite 190 comprises X-Ray mirrors for focusing X-rays for improved detection or imaging.

In some examples, satellite detector housing 191 is provided around radiation detection system 180. One or more grids 100, positioned within satellite detector housing 191, are used to restrict the radiation pathway, e.g., to only include the radiation reflected from X-ray mirrors 192. X-ray mirrors 192 may be constructed to have a single reflection or a double reflection depending on the desired focusing characteristics. Satellite detector housing 191 may or may not include the X-ray mirrors 192, e.g., depending on the satellite design.

Monocrystalline Silicon Carbide Grid Examples

Figure 2A:
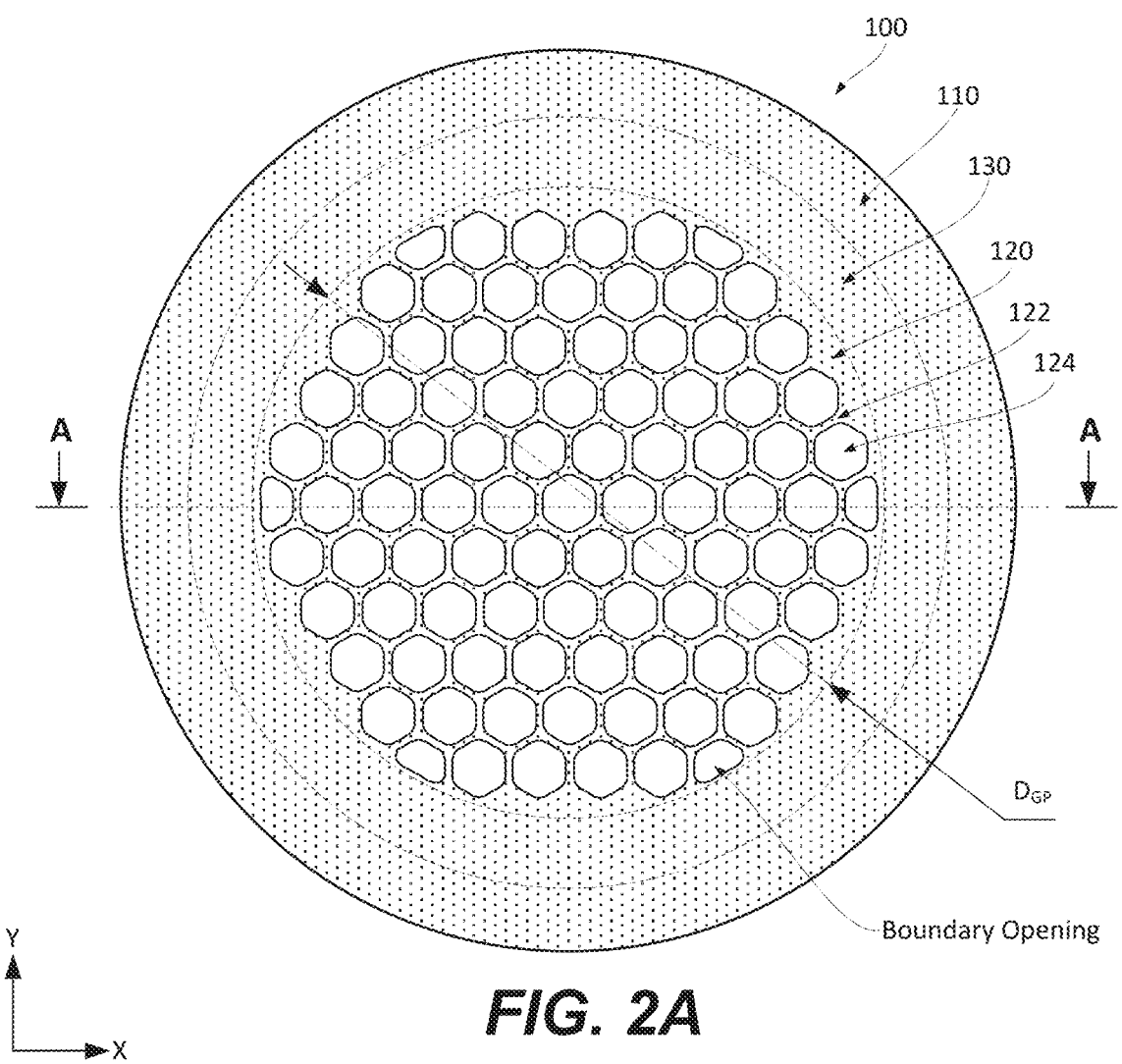
FIG. 2A is a top schematic view of a monocrystalline silicon carbide grid illustrating a plurality of ribs defining a plurality of grid openings, in accordance with some examples.
Figure 2B:
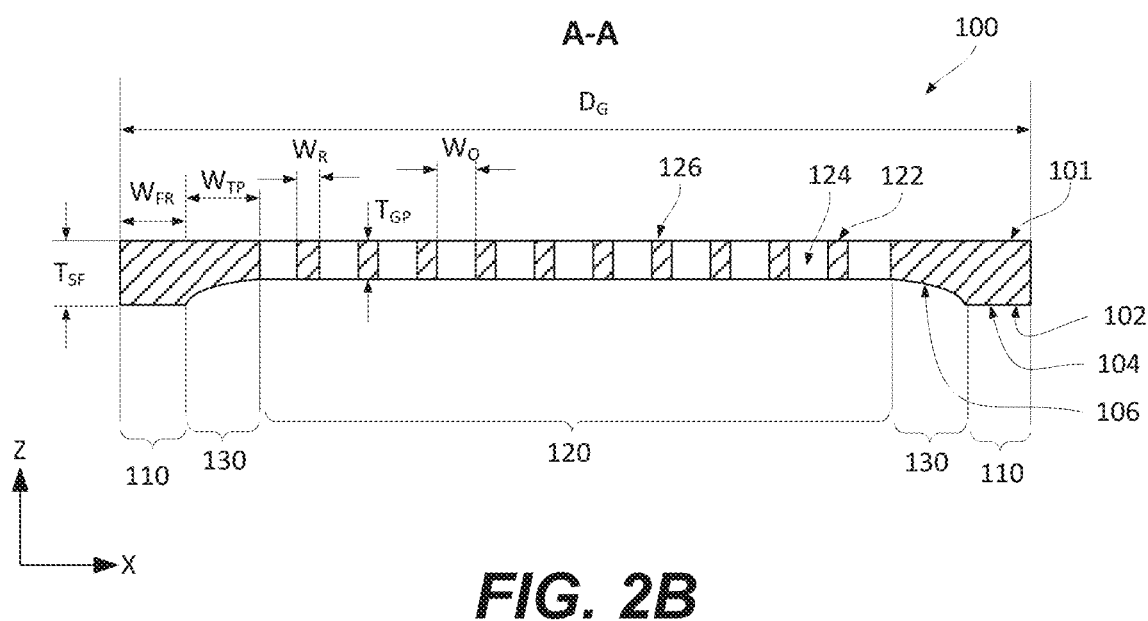
FIG. 2B is a side cross-sectional of the monocrystalline silicon carbide grid of FIG. 2A, in accordance with some examples.

FIG. 2A is a schematic top view of grid 100 for radiation transmittance and/or electromagnetic field control, in accordance with some examples. FIG. 2B is a schematic cross-sectional view of grid 100 in FIG. 2A. In some examples, grid 100 comprises support frame 110 and grid portion 120, integrated with support frame 110 such that support frame 110 and grid portion 120 form monocrystal silicon carbide.

Grid portion 120 comprises plurality of ribs 122 defining plurality of grid openings 124.

A monocrystal is defined as a physically connected material in which the crystallographic orientation is substantially fixed throughout the material. The degree of crystallographic orientation can be defined by a "pole diagram", which maps the orientation of given crystallographic planes within the grid assembly onto a sphere. For example, hexagonal silicon carbide orientation can be defined by mapping the orientations of the [001] c-axis and the [100] a-axis onto a sphere. The sub-regions within a monocrystal can be separated by planar defects such as stacking faults, twin boundaries, or low angle grain boundaries, but are nevertheless oriented in fixed relation to one another. For purposes of the disclosure, a material is regarded as a monocrystal if the crystallographic poles of different regions within the physically connected monocrystal lie within about 2° of a fixed orientation relative to one another. Materials with a wider dispersion of crystallographic poles are regarded as polycrystalline. Monocrystallinity can be verified by constructing an X-ray pole diagram from different parts of the material and/or based on the process history of the material. Monocrystal silicon carbide wafers are generally grown as a boule via directional growth from a seed crystal, such as a semiconductor wafer. Monocrystals can also be grown to include silicon carbide via homoepitaxial or heteroepitaxial deposition, changing the phase composition or doping profile within a monocrystal. Common silicon carbide polymorphs 2H—SiC, 4H—SiC, 6H—SiC, and 3C—SiC are related to one another via their different stacking sequences along a crystallographic axis. Mixtures of these and other polymorphs can exist within the same monocrystal by altering their atomic stacking sequence along a given crystal axis, and such stacked compositions are still considered monocrystals.

Silicon carbide monocrystal has been found to have high strength with relatively little material, needed for ribs 122 of grid 100. Even very thin ribs 122 can withstand significant pressure differential across grid 100, e.g., at least 1 Bar or even at least 2 Bar. For example, grid 100 can be used as a vacuum window with a thin polyimide film (e.g., 25 micrometers thickness) positioned over grid portion 120 (and, in some examples, also extending over at least a part of support frame 110). In this example, grid portion 120 has a diameter of 10 millimeters and may be referred to as a "frame aperture" (a general area including all grid openings 124). Continuing with the example, each of grid openings 124 has an opening size of 460 micrometers, which may be referred to as a grid aperture. The opening size is defined as the largest dimension of the opening within a plane parallel to primary surface 101 of grid 100 (e.g., parallel to the X-Y plane identified in FIG. 2A). In the same example, the width of each rib 122 is 40 micrometers, while the thickness of each rib is 120 micrometers. This specific example has successfully withstood the pressure differential of 1 Bar without failure. In another example, monocrystal silicon carbide grid 100 was fabricated with plurality of ribs 122 having a width of 15 micrometers and an open area fraction of 95%. This example successfully withstood laboratory handling and contact with an applied membrane.

Monocrystalline silicon carbide has been found to improve grid properties relative to other materials (e.g., silicon) in several ways. Its high thermal conductivity improves the temperature uniformity across monocrystal silicon carbide grid 100. The low X-ray absorption and scattering of silicon carbide make monocrystalline silicon carbide a superior material for X-ray and electron window application of grid 100. The high modulus of silicon carbide monocrystal increases its mechanical resonant frequency, improving its survival in vibrating environments. The high strength of silicon carbide monocrystal reduces the amount of material required to form a high strength grid, also reducing radiation absorption and other deleterious effects. For a given structure, silicon carbide has a substantially higher mechanical resonant frequency than, for example, silicon monocrystal due to its higher modulus to density ratio. Silicon carbide monocrystal has a Mohs hardness of 9, compared with 6.5 for silicon monocrystal, causing it to be resistant to tool scratching.

Even though silicon carbide monocrystals have low fracture toughness, the low flaw density and the hardness of silicon carbide monocrystals compensate for the reduced toughness making the silicon carbide monocrystals suitable for various grid applications. In the above-referenced example, the grid was able to withstand a pressure differential of 2 Bar, corresponding to average stress of 900 MPa. While not wishing to be bound by theory, the grid strength is attributed to the high hardness of silicon carbide. Silicon carbide can be only scratched by diamond and a few other materials. Even though silicon carbide monocrystal has a low fracture toughness compared with materials such as polycrystalline silicon carbide, this crystal resists the formation of initial cracks due to its high hardness, and thus permits high strength grid assemblies.

In some examples, the material (forming grid 100) is a silicon carbide monocrystal of the polymorphs 3C—SiC, 2H—SiC, 4H—SiC, or 6H—SiC, or combinations thereof. These polymorphs are related to one another by their stacking sequences. As such, various polymorphs can exist within the same monocrystal by alterations in the crystalline stacking sequence as the monocrystal is grown (e.g., via homoepitaxy or heteroepitaxy). For polymorphs with hexagonal crystal symmetry, in some examples, the orientation is with the crystallographic c-axis within 8° of primary surface 101 of grid 100. It should be noted that a wafer used to form grid 100 has this orientation to maximize in-plane mechanical isotropy.

In some examples, the monocrystal comprises doped regions, e.g., regions comprising different dopants to provide varying electrical characteristics and electrical junctions within the overall structure. For example, an n-type dopant may be used to achieve the resistivity of less than 1 Ohm-cm and to provide electromagnetic shielding of the radiation detector.

Referring to FIGS. 2A and 2B, support frame 110 is free from grid openings 124. Support frame 110 is operable as mechanical support during the manufacture of grid 100. Support frame 110 can be used for providing electrical contacts to plurality of ribs 122. In some examples, the electrical contact can be made to support frame 110 using conductive springs, solder, or conductive epoxy, e.g., disposed between support frame 110 and a conductive housing. In some examples, the electrical contact is formed using wires connected to an external electrical circuitry and plurality of ribs 122, e.g., to provide a voltage to plurality of ribs 122 relative to the housing. In some examples, such as for electromagnetic interference, the electrical contact is made capacitively. Furthermore, support frame 110 can be used for mounting grid 100 into a housing (e.g., in a radiation detection system). In some examples, holes or other features can be provided in support frame 110 for mounting purposes, for example, kinematic mounts.

Referring to FIGS. 2A and 2B, as noted above, plurality of ribs 122 defines plurality of grid openings 124. The rib width is smaller (on average) than the opening size/grid aperture. In some examples, the opening size is at least twice greater than the rib width or, more specifically, at least 5 times greater or even at least 10 times greater. In some examples, each of plurality of ribs 122 has a width from 2 micrometers to 200 micrometers or, more specifically, from 10 micrometers to 100 micrometers. Even at such small rib widths, ribs 122 can provide sufficient mechanical support within the overall silicon carbide grid assemblies.

In the same or other examples, each plurality of grid openings 124 has an opening size from 20 micrometers to 5,000 micrometers or, more specifically, from 100 micrometers to 1,000 micrometers. For example, a telescope X-ray detector may use a grid with the rib width from 5 micrometers to 200 micrometers and the aperture dimension from 300 micrometers to 5000 micrometers. Electron microscopy may use a grid with the rib width from 1 micrometer to 30 micrometers and the aperture dimension from 1 micrometer to 1000 micrometers.

Each of grid openings 124 can have a polygonal shape, e.g., rectangle, hexagon, or irregular hexagon. In more specific examples, the shape is polygonal with rounded corners. Rounded corners reduce stress concentration and improve the tolerance of grid 100 to manufacturing errors.

In some examples, the majority of grid openings of plurality of grid openings 124 have a hexagon shape or a square shape. In more specific examples, plurality of grid openings 124 comprises one or more boundary openings having a shape different from hexagon shape and square shape. These boundary openings establish a uniform boundary of grid portion 120, e.g., a circular boundary as shown in FIG. 2A. In some examples, the boundary of grid portion 120 has a diameter ($D_{GP}$) of from 0.1 millimeters to 200 millimeters or, more specifically, from 1 millimeter to 180 millimeters.

A combination of the rib width, the opening size, and the opening shape define an open area fraction of grid portion 120. In some examples, the open area fraction of grid portion 120 is at least 50% or at least 80% or even at least 90%. A larger open area fraction provides fewer radiation obstructions. However, grid 100 with a larger open area fraction tends to also be mechanically weaker.

In some examples, grid portion 120 has a thickness from 1 micrometer to 1,000 micrometers or, more specifically, from 50 micrometers to 500 micrometers. In the same or other examples, the rib aspect ratio is at least 0.5 or, more specifically, at least about 1 or even at least about 2. For purposes of this disclosure, the rib aspect ratio is defined as a ratio of the rib thickness to the rib width. As noted above, a larger aspect ratio increases the grid strength and heat conductance, which can be beneficial for radiation detector systems and other applications.

Figure 2C:
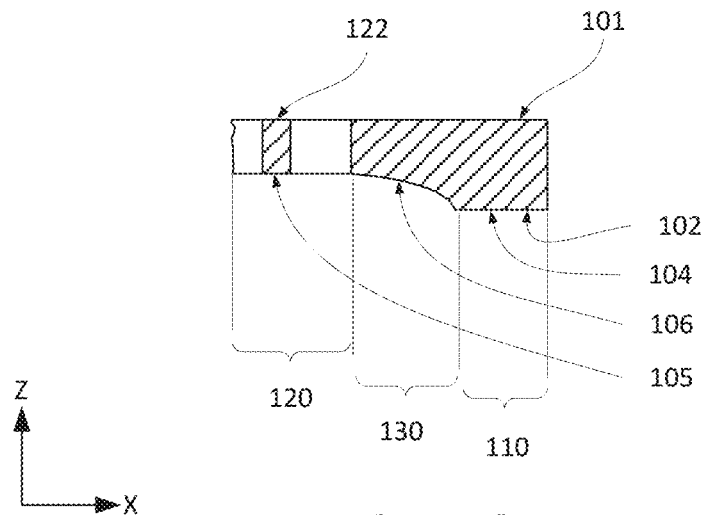
FIG. 2C is a side cross-sectional of a monocrystalline silicon carbide grid, illustrating an example of the transition between the support frame and the grid portion.
Figure 2D:
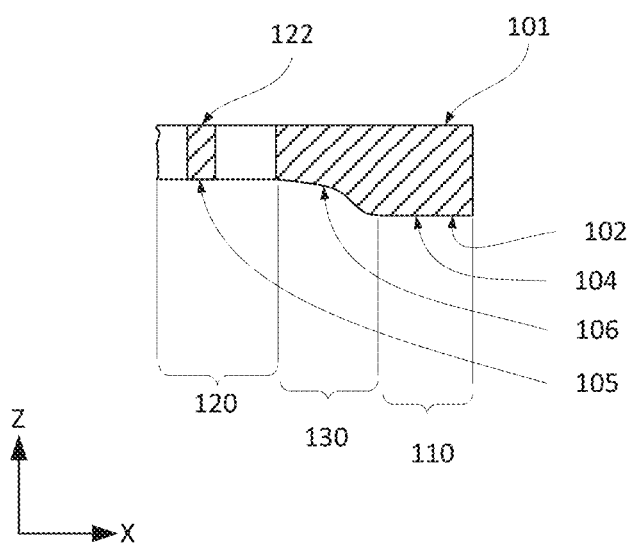
FIG. 2D is a side cross-sectional of a monocrystalline silicon carbide grid, illustrating another example of the transition between the support frame and the grid portion.

The grid portion thickness may be the same as the support frame thickness (e.g., by patterning from one side only or by etching the same pattern into both sides of the starting substrate). Alternatively, the grid portion thickness is smaller than the support frame thickness, e.g., as shown in FIG. 2B. For example, grid 100 further comprises transition portion 130, integrated with and positioned between support frame 110 and grid portion 120. Transition portion 130 provides a gradual thickness transition from the thickness of grid portion 120 to the thickness of support frame 110. Some examples of transition portion 130 are shown in FIGS. 2C and 2D. In some examples, transition portion 130 has a width from 50 micrometers to 10,000 micrometers, or more specifically from 200 micrometers to 5000 micrometers.

For example, grid 100 comprises primary surface 101 and secondary surface 102. Primary surface 101 is flat across support frame 110, transition portion 130, and grid portion 120. First portion 104 of secondary surface 102 formed by support frame 110 is parallel to a second portion 105 of secondary surface 102 formed by grid portion 120. In some examples, third portion 106 of secondary surface 102 formed by transition portion 130 is curved. For example, third portion 106 of secondary surface 102 has a tapered shape. In some examples, e.g., shown in FIG. 2D, third portion 106 of secondary surface 102 has an inflection point.

In some examples, the transition from the thickness of grid portion 120 to the thickness of support frame 110 is physically abrupt. A physically abrupt step transition can be simpler to manufacture when an etch mask is attached to a monocrystal substrate.

In some examples, plurality of ribs 122 defines primary grid surface 126 having a flatness from 10 micrometers to 1000 micrometers or, more specifically, between 50 micrometers to 500 micrometers. Flatness allows subsequent operations, such as membrane attachment, to be performed with greater precision. Flatness also improves the function of grid 100 by placing grid 100 spatially relative to the detector with greater precision. For example, if the detector is physically close to grid 100 and is voltage biased relative to grid 100, the resulting electric field uniformity is degraded by departures from flatness. Primary grid surface 126 can be oriented in either direction relative to the detector to optimize the grid function. In the same or other examples, the primary surface has a surface roughness between 0.1 nanometers and 1000 nanometers or, more specifically, from 1 nanometers and 100 nanometers. Surface roughness is desirable for attaching films or membranes to primary grid surface 126, due to the difficulty of adhesion to highly polished silicon carbide. Surface roughness can also be used to control the reflectance and thermal emittance of grid 100.

In some examples, the silicon carbide forming the grid assembly has Young's modulus from 200 GPa to 1000 GPa. These characteristics ensure the dimensional stability of the grid assembly.

Figure 2E:
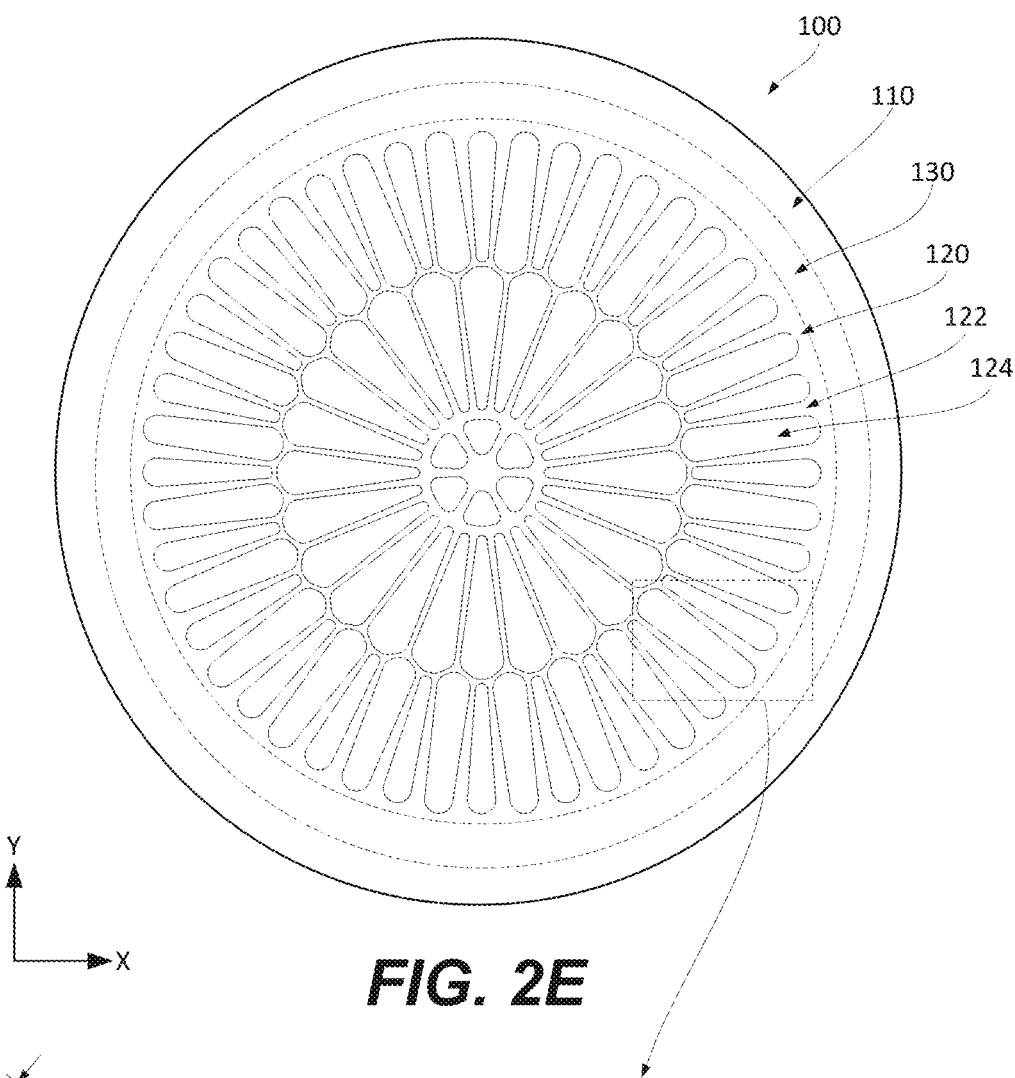
FIG. 2E is a top schematic view of a monocrystalline silicon carbide grid illustrating another example of ribs and grid openings.
Figure 2F:
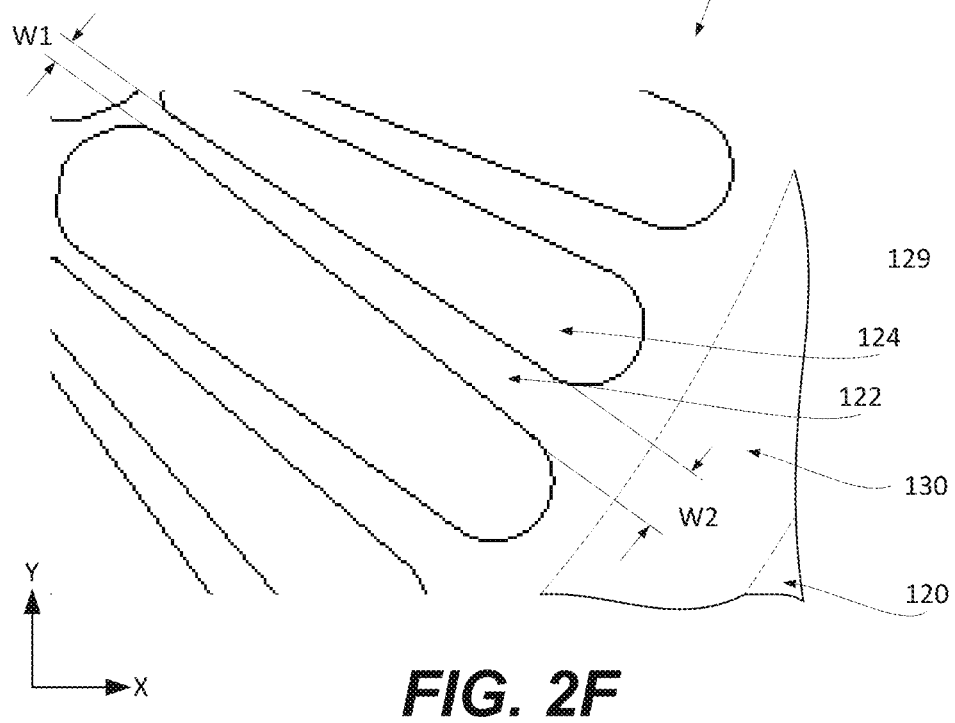
FIG. 2F is an expanded view of a portion of FIG. 2E illustrating variation of the rib width, in accordance with some examples.

Referring to FIGS. 2E and 2F, in some examples, ribs 122 are tapered out/wider toward support frame 110 or, if present, toward transition portion 130. This tapering reduces stress concentrations in the rib material. For example, the outer rib width (W2) is between 10% and 300% wider than the inner rib width (W1). In some examples, the radius of curvature of ribs 122 at their ends is between 50% and 500% of the inner rib width (W1). Grid openings 124 are shaped as irregular tapered hexagons with rounded corners.

Figure 3A:
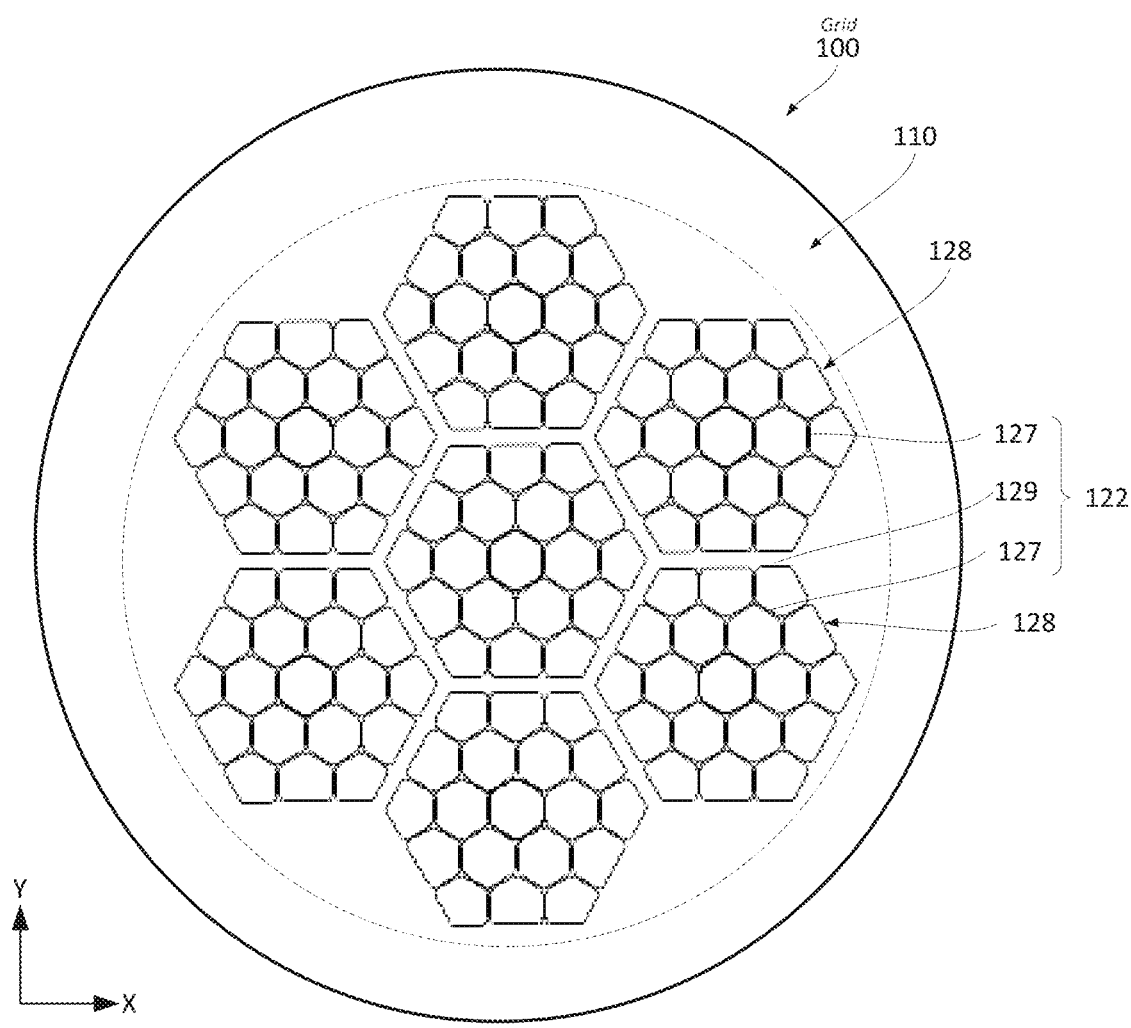
FIG. 3A is a top schematic view of a monocrystalline silicon carbide grid illustrating another example of ribs and grid openings.
Figure 3B:
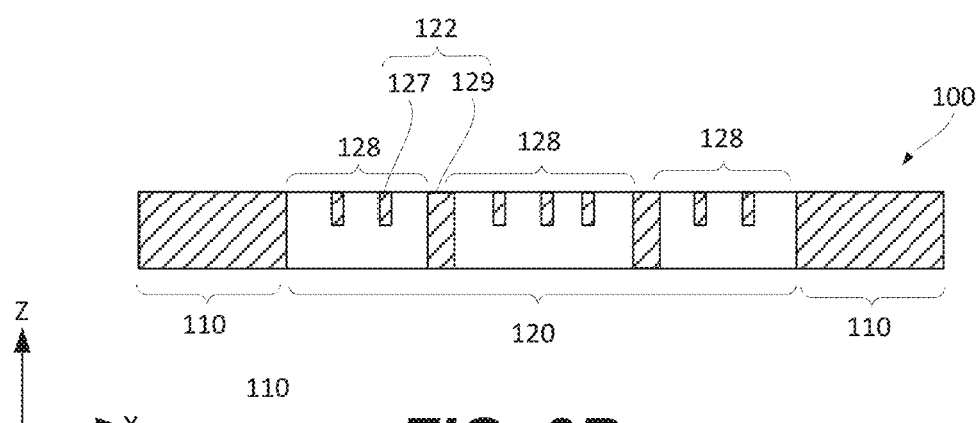
FIG. 3B is a side cross-sectional of the monocrystalline silicon carbide grid of FIG. 3A, in accordance with some examples.

Referring to FIGS. 3A and 3B, in some examples, grid portion 120 comprises multiple sub-grids 128. For example, FIG. 3A illustrates an example with seven sub-grids 128, each shaped like a regular hexagon with rounded corners. Adjacent sub-grids 128 are interconnected with primary ribs 129, while each sub-grid 128 is formed by secondary ribs 127. Both primary ribs 129 and secondary ribs 127 are specific examples of plurality of ribs 122, collectively forming grid portion 120. Sub-grids 128 provide additional thermal conductance and strength to the membrane while minimizing the amount of material needed to perform the grid function. Sub-grids 128 also allow thinner secondary ribs 127, greatly reducing the amount of radiation occlusion for radiation that is not normally incident to the grid plane. For example, the radiation from X-ray mirrors in FIG. 1B may be non-normal at angles up to 10°.

Referring to FIG. 3B, in some examples, ribs 122 have different thicknesses and/or widths. For example, primary ribs 129 are wider and/or thicker than secondary ribs 127. In some examples, primary ribs 129 are at least twice wider or even three times wider than secondary ribs 127. In the same or other examples, a ratio of the secondary rib thickness to the primary rib thickness is less than 80% or less than 60% or even less than 40%. Primary ribs 129 can support a network of smaller-thinner ribs, e.g., secondary ribs 127. Secondary ribs 127, in turn, support a membrane.

Figure 3C:
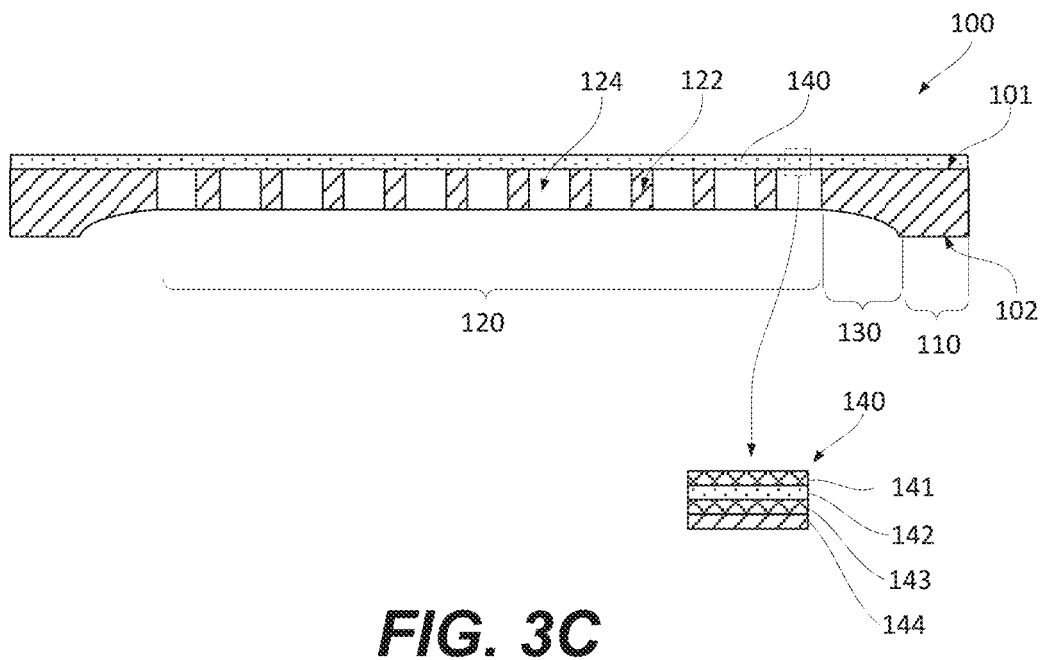
FIG. 3C is a side cross-sectional of a monocrystalline silicon carbide grid comprising a membrane, in accordance with some examples.

Referring to FIG. 3C, in some examples, grid 100 further comprises membrane 140 entirely covering grid openings 124. Specifically, membrane 140 is positioned over, directly interfaces, and conforms to primary surface 101 formed by at least grid portion 120. Membrane 140 can be operable as a contamination blocking filter. For example, membrane 140 can form an entrance aperture of the detector to prevent outside physical contaminants from reaching the radiation detector as described above with reference to FIG. 1A.

In some examples, membrane 140 is made from a bilayer of polyimide and aluminum. For example, aluminum can be an alloy with up to 5% atomic impurities. In the same or other examples, the thickness of membrane 140 is from 10 nanometers to 2000 nanometers or, more specifically, from 30 nanometers to 1000 nanometers. The membrane has a visible light transmittance of less than 10%, or more specifically less than 1%.

Physical contaminants can adsorb onto membrane 140 and polymerize over time, interfering with the proper function of the radiation detector (e.g., losing the calibration and sensitivity to low-energy radiation). In the case where the detector is cooled, such as a cooled CCD camera, a cooled CMOS camera, or an X-ray microcalorimeter, the detector causes net radiative heat loss to occur from a filter placed in the radiation path, lowering the membrane temperature.

The use of monocrystal silicon carbide grid 100 significantly improves the temperature uniformity of membrane 140 (e.g., used as a contamination blocking filter). For example, a model filter calculation was performed for an X-ray telescope instrument equipped with a cooled CCD camera and a 30-nanometer thick aluminum with a 50-nanometer thick polyimide bilayer membrane placed in the radiation path. For the filter incorporating a stainless steel grid assembly, the model calculation shows a 36° C. temperature nonuniformity. For a filter incorporating a monocrystalline silicon carbide grid assembly, the model calculation showed a temperature nonuniformity of 12° C. As such, monocrystal silicon carbide grid 100 helps to reduce the expected rate of contaminant accumulation in a spacecraft vacuum environment by more than 100× based on this improved temperature uniformity. Similar thermal improvements are modeled for the case where the radiation detection system is a cooled X-ray microcalorimeter detector.

In some examples, membrane 140 is attached to primary surface 101. For example, membrane 140 with low gas leak rate (e.g., less than 1E-3 milliBar-Liters/sec) is attached to primary surface 101 with adhesive. Membrane 140 forms a window that supports a gas pressure differential, creating a vacuum window. With suitable choices of polymers, ceramics, and metals, membrane 140 can protect an X-ray detector while simultaneously allowing the passage of X-rays. Monocrystal silicon carbide grid 100 or, more specifically, grid portion 120 absorbs minimal X-rays at energies of interest, for example, X-rays with energy between 0.1 keV and 10 keV.

In some examples, membrane 140 comprises a metal layer that blocks a portion of infrared radiation and heat from being transmitted toward the detector. Monocrystal silicon carbide grid 100 or, more specifically, grid portion 120 efficiently conducts heat to support frame 110 (and from support frame 110 to external components). In more specific examples, the metal layer of membrane 140 comprises aluminum, copper, indium, or silver. In some examples, the metal layer of membrane 140 is further supported by a thin polymer layer, such as polyimide, polycarbonate, or polypropylene. In some examples, a thin adhesion layer joins the polymer layer and the metal layer.

FIG. 3C also provides an expanded cross-sectional view of membrane 140, illustrating four possible layers. For example, layer 141 is an optional metal top layer. In some examples, layer 141 is formed from zirconium, aluminum, indium, tin, silver, and/or gold. Layer 142 is an optional mechanical layer, e.g., made from ceramic (such as silicon nitride, silicon carbide, carbon, boron, silicon) or polymer (such as polyimide, polycarbonate, polyethylene). Layer 143 is an optional adhesion layer that can be on either or both sides of the mechanical layer 142. Finally, layer 144 is an optional bottom metal layer, which may be formed in some examples from zirconium, aluminum, indium, tin, silver, and/or gold.

In some examples, membrane 140 is constructed to act as an X-ray filter by selecting membrane materials with low absorptance at the desired X-ray energy. For example, membrane 140 can be fabricated from 200-nanometer thick zirconium to provide high X-ray transmittance from 0.05 keV to 0.2 keV, while providing low X-ray transmittance at nearby X-ray energies. Grid portion 120 and support frame 110 efficiently dissipate the absorbed energy to the surrounding components via heat conduction. Suitable membrane materials comprise aluminum, polyimide, silicon nitride, silicon carbide boron, zirconium, silicon, indium, and combinations thereof. Other polymers, metals, and ceramics can be used to form membrane 140 as well. In some examples, membrane 140 comprises a metal foil that conducts heat to grid portion 120, which then conducts heat to a thermal reservoir located at support frame 110.

In some examples, membrane 140 is attached to a monocrystal silicon carbide wafer by vacuum deposition of the membrane material onto the wafer. The wafer is then processed to form plurality of grid openings 124, with membrane 140 left supported on plurality of ribs 122 and, in some examples, on support frame 110.

Figure 3D:
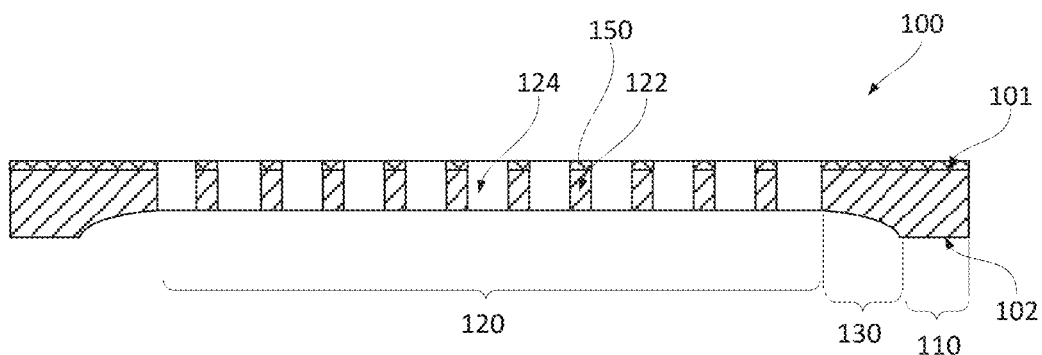
FIG. 3D is a side cross-sectional of a monocrystalline silicon carbide grid comprising a conductive coating, in accordance with some examples.
Figure 3E:
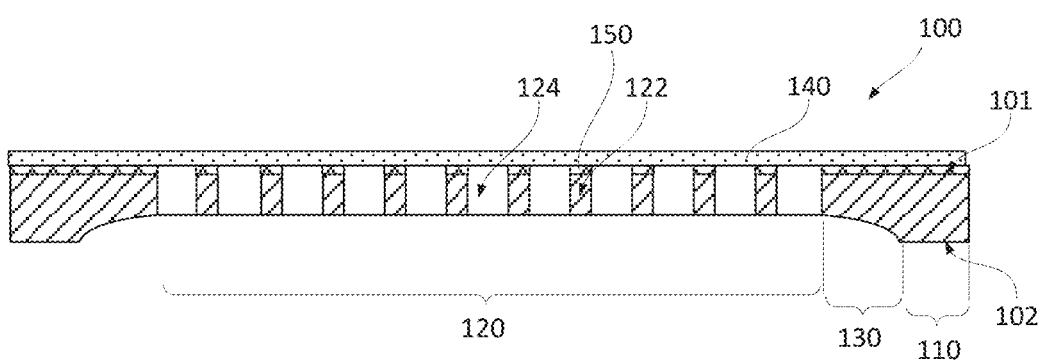
FIG. 3E is a side cross-sectional of a monocrystalline silicon carbide grid comprising a conductive coating and a membrane, in accordance with some examples.

Referring to FIGS. 3D and 3E, in some examples, grid 100 further comprises conductive coating 150, disposed on each of plurality of ribs 122. Conductive coating 150 increases the electrical conductance and reduces the emissivity of grid 100, e.g., to reduce the flux of heat and undesired electromagnetic radiation towards a radiation detector. For example, conductive coating 150 is formed from aluminum, copper, silver, indium, and/or gold. Conductive coating 150 reduces electromagnetic transmittance in the wavelength range spanning kilohertz to terahertz. It should be noted that grid openings 124 are small compared with the wavelength of the undesired electromagnetic waves.

When both conductive coating 150 and membrane 140 are present (e.g., as shown in FIG. 3E), conductive coating 150 is disposed between primary surface 101 and membrane 140. In some examples, conductive coating 150 is used without membrane 140, e.g., as shown in FIG. 3D, in which case, conductive coating 150 can be exposed.

In some examples, monocrystal silicon carbide grid assemblies are used to control electromagnetic fields. In one embodiment, a pair of grids are placed in the path of traversing charged particles, such as electrons or protons. A voltage is provided between the grid assemblies to create an electric field to accelerate and steer the charged particles. Time-varying fields can be applied to perform spectroscopy or beam filtering. In one embodiment, the silicon carbide monocrystal material is doped to be sufficiently electrically conductive to provide a uniform voltage across its diameter.

Fabrication Methods

Figure 4:
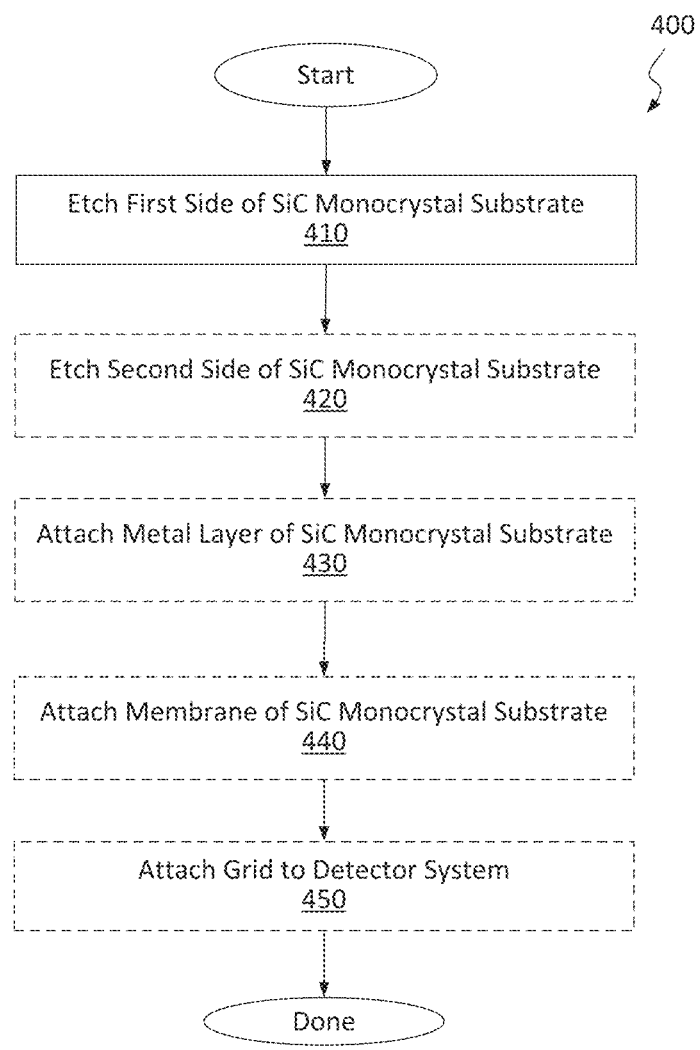
FIG. 4 is a process flowchart corresponding to a method of forming a monocrystalline silicon carbide grid, in accordance with some examples.

Various examples of grid 100, described above, can be manufactured by various techniques, which will now be described with reference to FIG. 4. Specifically, FIG. 4 is a process flowchart corresponding to method 400 used to manufacture grid 100, in accordance with some examples. A silicon carbide monocrystal wafer can be used in this method. For example, a wafer can have a diameter of 50 millimeters, 100 millimeters, 150 millimeters, or 200 millimeters, although other wafer dimensions are also within the scope. In the same or other examples, a wafer has a thickness from 100 micrometers to 600 micrometers. In general, a silicon carbide monocrystal wafer can be referred to as a silicon carbide monocrystal substrate.

Method 400 comprises etching (block 410) the first side of a silicon carbide monocrystal substrate, e.g., using plasma etching. For example, an etch mask, which is formed from nickel or copper, is deposited and patterned on the silicon carbide monocrystal substrate. The etch mask protects the desired portions of the substrate, while other parts are removed, e.g., forming plurality of grid openings 124. In some examples, electrochemical wet etching of an electrically conductive silicon carbide monocrystal substrate is used.

In some examples, method 400 proceeds with etching (block 420) the second side of the substrate. This is an optional operation. Electrochemical or plasma etching can be used for this operation. The pattern using during this operation can be different from the pattern used in the previous operation. For example, when the second side is etched the pattern is selected to form a 2-level grid (shown in FIG. 3B) or a tapered transition portion 130 (shown in FIGS. 2C and 2D). For example, the second side etch can form tapered transition portion 130 between support frame 110 and grid portion 120 by shadow masking. In some examples, the first side etch is a grid pattern with a small scale feature size (to form grid openings 124), while the second side etch is a grid pattern with a larger scale feature size.

In some embodiments, grid 100 is retained in the remaining portion of a substrate during etching by patterned tab features (e.g., connecting the remaining substrate to support frame 110 of grid 100). After etching, the tabs are removed (e.g., by hard tools) to separate grid 100 from the remaining wafer substrate.

In some examples, several grid patterns are simultaneously etched into a silicon carbide monocrystal substrate. This operation is followed by the tab breakout of the multiple grids from the remaining portion of the substrate.

In some examples, the grid is etched from a silicon carbide monocrystal substrate previously having the desired outer shape, without the need for hard tool breakout.

In some examples, the outer diameter of grid 100 is formed by laser cutting.

In some examples, method 400 proceeds with attaching (block 430) a metal layer to at least grid portion 120. This is an optional operation. In some examples, the metal layer is attached by vacuum deposition, such as by sputtering or evaporation. In other examples, the metal layer is attached by wet coating, for example by plating or electroplating nickel, gold, or silver. In some examples, an adhesion layer, such as chromium, titanium, or other transition metal, is deposited onto the ribs before depositing the metal layer. In some examples, the conductive metal layer is aluminum, silver, or gold, with thickness between 30 nanometers and 2000 nanometers, or more preferably, 100 nanometers and 1500 nanometers. In some examples, the metal coating covers additional surfaces of the grid portion, for example, the back surface or the sides of the grid bars.

In some examples, method 400 proceeds with attaching (block 440) a membrane to at least grid portion 120. This is an optional operation. In some examples, the membrane is provided on a fixture and is attached to the grid bars with adhesive, followed by removal of the fixture. In some examples, the membrane is initially attached to a substrate, such as a silicon wafer, and is attached to the grid with adhesive. After adhesive curing, the silicon wafer is removed, leaving the membrane attached to the grid.

In some examples, method 400 proceeds with attaching (block 450) grid 100 to a detector system. The grid assembly is attached to an intermediate housing via epoxy, electrically conductive epoxy, brazing, mechanical clamping, or other methods. The grid assembly and housing are then attached to the detector system via appropriate screws, clamps, brazing, welding, or adhesive.

Experimental Data

Various experiments have been conducted to test the strength and other characteristics of monocrystalline silicon carbide grids described above. In one test, pressure windows were fabricated from monocrystal silicon carbide grids. Seven monocrystal grids were simultaneously etched into a 170-micrometer thick silicon carbide monocrystal wafer. The frame aperture was 10 millimeters, the grid bar width was 55 micrometers, the grid bar thickness was 95 micrometers, and the grid bar pitch was 500 micrometers. The frame width was 2000 micrometers and the transition region width was 1000 micrometers. The finished grid structures were assembled into pressure windows. Failure stresses were measured in the range 1000 MPa to 1500 MPa, which is more than 10× higher than the stress limit in a silicon grid, which is typically 100 MPa.

The following equation approximates the stress in the grid when a pressure differential is applied across a supported membrane $$\sigma = 2.66\, P \frac{A_F^2}{T_{GP}^2} \frac{W_R + W_0}{W_R}$$

Figure 5:
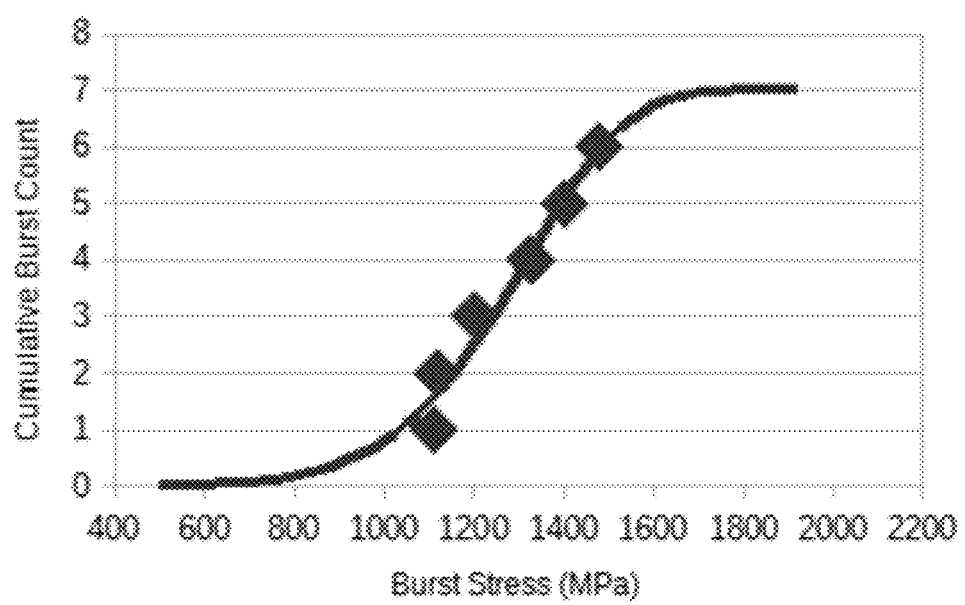
FIG. 5 is a plot of cumulative burst count as a function of the burst stress.

The membrane can be pressurized until the underlying grid fails by bursting. FIG. 5 illustrates a graph of the measured burst pressure for a collection of 6 grids. Grid burst pressure ranges from 1000 MPa to 1500 MPa. The observed grid burst pressures are very high relative to silicon grids. For example, a commercial silicon grid analyzed by the above equation provides maximum use stress of 100 MPa, only about 10% of the minimum observed burst stress for the silicon carbide grids.

The graph in FIG. 5 also shows a curve described by a cumulative Weibull distribution, often used to characterize failure in ceramic materials. The fitting parameters for the curve are a stress scale parameter of 1400 MPa, and a Weibull modulus of 6. Surprisingly, this Weibull modulus is very high for an untoughened material having low fracture toughness. Typical low fracture toughness materials have a Weibull modulus of less than 3.

Without wishing to be bound by theory, it is surmised that the high strength and high Weibull modulus of the monocrystal silicon carbide grids are associated with their relative perfection, with very few flaws greater than 5 microns in size.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered illustrative and not restrictive.

What is claimed is:

1. A monocrystal silicon carbide grid for radiation transmittance of electromagnetic field control, the grid comprising:
    a support frame; and
    a grid portion, integrated with the support frame such that the support frame and the grid portion collectively form the monocrystal silicon carbide grid,
    wherein the grid portion comprises a plurality of ribs defining a plurality of grid openings.

2. The monocrystal silicon carbide grid of claim 1, wherein an open area fraction of the grid portion is at least 50%.

3. The monocrystal silicon carbide grid of claim 1, wherein each of the plurality of ribs has a width from 2 micrometers to 200 micrometers.

4. The monocrystal silicon carbide grid of claim 1, wherein each the plurality of grid openings has an opening size from 20 micrometers to 5000 micrometers.

5. The monocrystal silicon carbide grid of claim 1, wherein the grid portion has a thickness from 5 micrometers to 1,000 micrometers.

6. The monocrystal silicon carbide grid of claim 1, further comprising a transition portion, integrated with and positioned between the support frame and the grid portion.

7. The monocrystal silicon carbide grid of claim 6, wherein:
    a thickness of the grid portion is less than a thickness of the support frame; and
    the transition portion provides a thickness transition from the thickness of the grid portion to the thickness of the support frame.

8. The monocrystal silicon carbide grid of claim 7, further comprising a primary surface and a secondary surface, wherein:
    the primary surface is flat across the support frame, the transition portion, and the grid portion; and
    a first portion of the secondary surface formed by the support frame is parallel to a second portion of the secondary surface formed by the grid portion.

9. The monocrystal silicon carbide grid of claim 8, wherein a third portion of the secondary surface formed by a transition portion is curved, has an inflection point, or has a step profile.

10. The monocrystal silicon carbide grid of claim 1, wherein the plurality of ribs define a primary grid surface having a flatness from 10 micrometers to 1000 micrometers.

11. The monocrystal silicon carbide grid of claim 1, wherein a majority of grid openings of the plurality of grid openings have a hexagon shape with rounded corners or a square shape with rounded corners.

12. The monocrystal silicon carbide grid of claim 1, wherein each of the plurality of ribs has an aspect ratio is at least 0.5.

13. The monocrystal silicon carbide grid of claim 1, wherein at least one portion of the monocrystal silicon carbide has a conductivity of at least 1/Ohm-centimeter.

14. The monocrystal silicon carbide grid of claim 1, wherein the monocrystal silicon carbide includes 4H—SiC polymorph.

15. The monocrystal silicon carbide grid of claim 1, further comprising a primary surface, oriented within 8° of crystallographic c-axis planes of the monocrystal silicon carbide.

16. The monocrystal silicon carbide grid of claim 1, further comprising a membrane entirely covering the plurality of grid openings.

17. The monocrystal silicon carbide grid of claim 16, wherein the membrane has a visible light transmittance of less than 10%.

18. The monocrystal silicon carbide grid of claim 1, further comprising a conductive coating, disposed on each of the plurality of ribs.

19. A radiation detection system comprising:
    a radiation detector, comprising a detector portion;
    a housing, enclosing at least the detector portion of the radiation detector; and
    a monocrystal silicon carbide grid, comprising a support frame and a grid portion, integrated with the support frame such that the support frame and the grid portion collectively form the monocrystal silicon carbide grid, wherein:
        the grid portion comprises a plurality of ribs defining a plurality of grid openings, and
        the grid portion is positioned on a detected radiation path; and
        the monocrystal silicon carbide grid is enclosed within the housing.

20. A satellite comprising:
    an assembly of X-ray mirrors;
    a satellite detector housing; and
    a radiation detection system comprising a monocrystal silicon carbide grid, which comprises a support frame and a grid portion, integrated with the support frame such that the support frame and the grid portion collectively form the monocrystal silicon carbide grid, wherein:
        the grid portion comprises a plurality of ribs defining a plurality of grid openings, and
        the grid portion is positioned on a detected radiation path.

* * * * *